Figure 1:
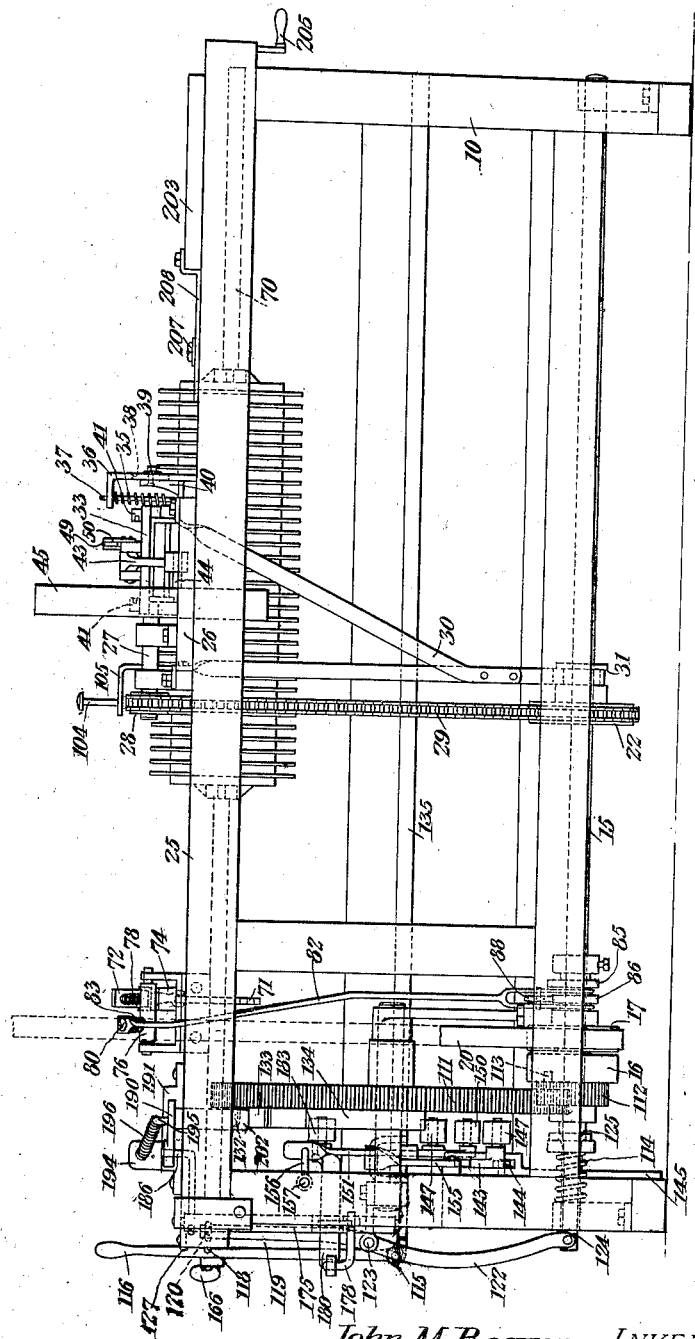

No. 845,843. PATENTED MAR. 5, 1907.
J. M. BEAVER.
SAW FILING MACHINE.
APPLICATION FILED APR. 18, 1906.

5 SHEETS—SHEET 1.

WITNESSES:

John M. Beaver INVENTOR
By
ATTORNEYS

No. 845,843. PATENTED MAR. 5, 1907.
J. M. BEAVER.
SAW FILING MACHINE.
APPLICATION FILED APR. 18, 1906.

5 SHEETS—SHEET 2.

WITNESSES:

John M. Beaver INVENTOR
By C.A. Snow & Co.
ATTORNEYS

No. 845,843. PATENTED MAR. 5, 1907.
J. M. BEAVER.
SAW FILING MACHINE.
APPLICATION FILED APR. 18, 1906.

5 SHEETS—SHEET 4.

WITNESSES:

John M. Beaver INVENTOR

By C. A. Snow & Co.

ATTORNEYS

No. 845,843. PATENTED MAR. 5, 1907.
J. M. BEAVER.
SAW FILING MACHINE.
APPLICATION FILED APR. 18, 1906.

5 SHEETS—SHEET 5.

WITNESSES:

John M. Beaver INVENTOR

By C. A. Snow & Co

ATTORNEYS

UNITED STATES PATENT OFFICE.

JOHN M. BEAVER, OF FORT WORTH, TEXAS.

SAW-FILING MACHINE.

No. 845,843.　　　Specification of Letters Patent.　　　Patented March 5, 1907.

Application filed April 18, 1906. Serial No. 312,456.

*To all whom it may concern:*

Be it known that I, JOHN M. BEAVER, a citizen of the United States, residing at Fort Worth, in the county of Tarrant and State of Texas, have invented a new and useful Saw-Filing Machine, of which the following is a specification.

This invention relates to saw-filing machines, and has for its principal object to provide a machine for sharpening gin and linter saws.

A further object of the invention is to provide a mechanism that is entirely automatic in its nature and which when once started will automatically move from saw to saw, sharpening all of the teeth of one saw, and for moving it into engagement with and sharpening all of the teeth of the next saw until the operation is complete.

A further object of the invention is to provide a device of this character in which provision is made for preventing accidental displacement of the parts or damage to the files and saws during the shifting from one position to the other.

A still further object of the invention is to provide an automatic stop mechanism of such construction as to permit the operation of the machine up to any desired point without the constant presence of an attendant.

A still further object of the invention is to provide a machine which may be accurately adjusted to suit saws having teeth of different pitch and in which the saws are arranged at different distances from each other.

A still further object of the invention is to provide a machine of this type in which the movement of the saw for the presentation of fresh teeth to the files may be made through positive mechanism operating at predetermined intervals or through means controlled by the resistance offered to the files during the sharpening of the teeth.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 2:
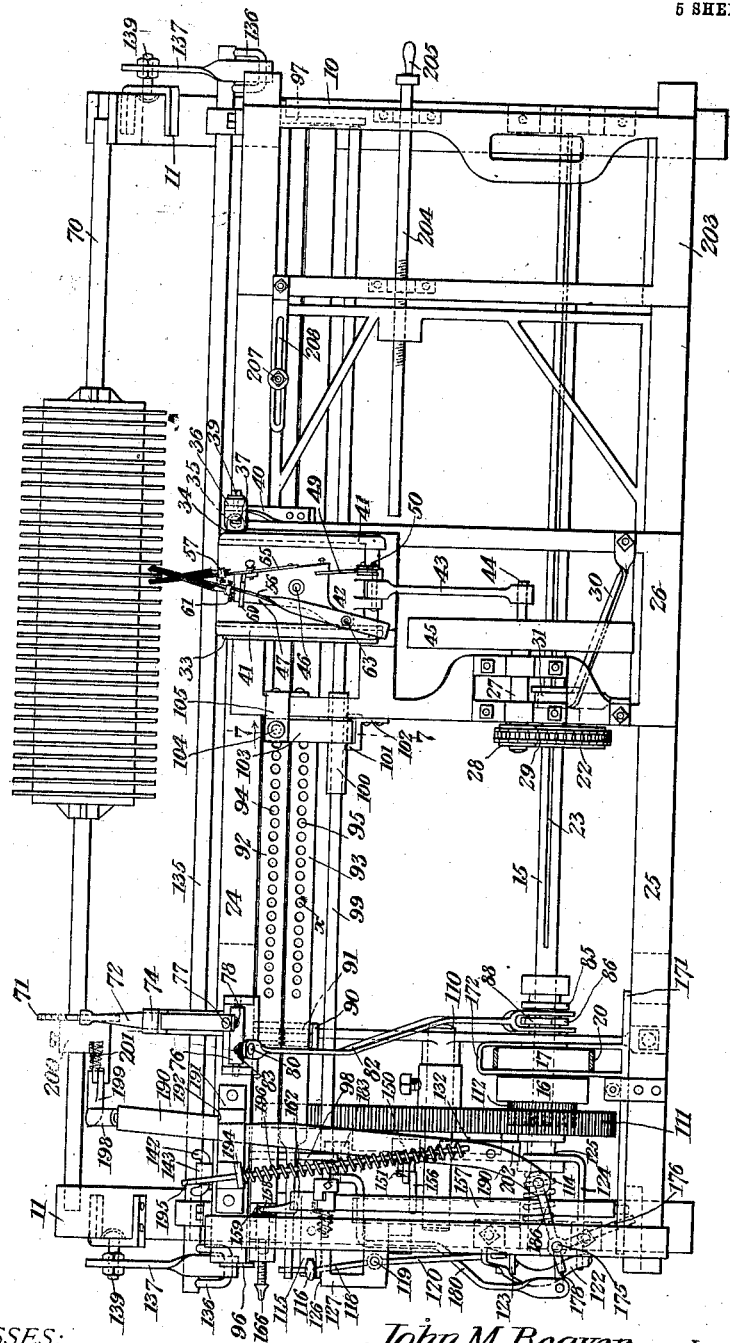
Figure 3:
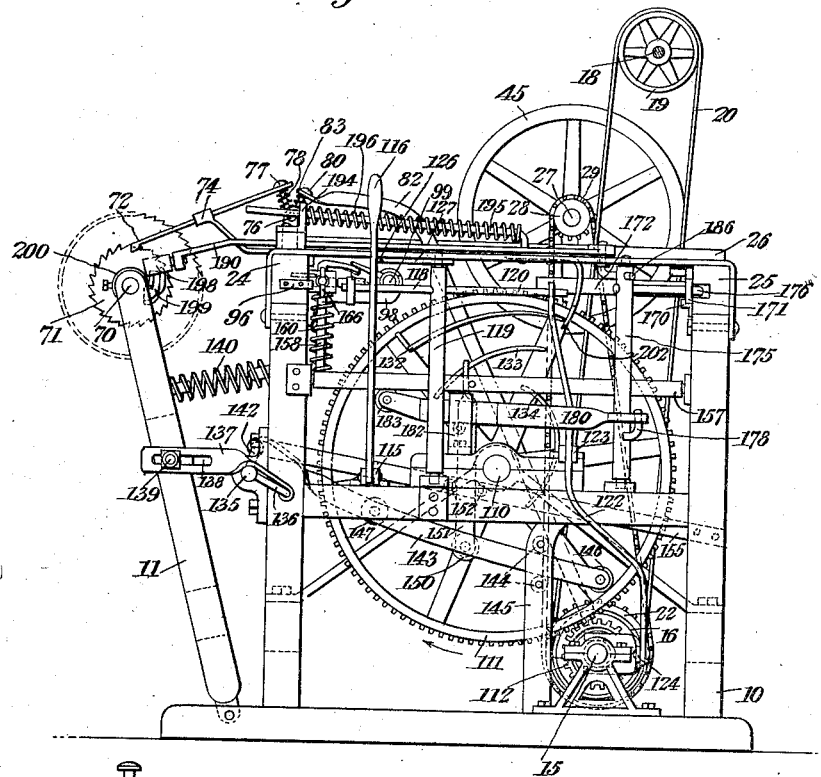
Figure 4:
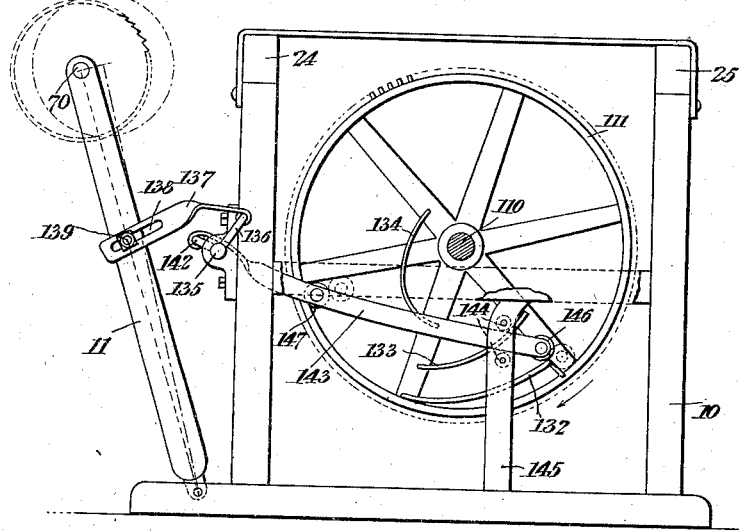
Figure 5:
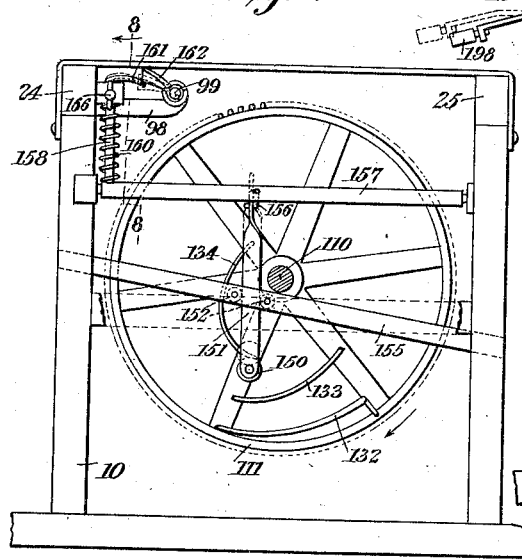
Figure 6:
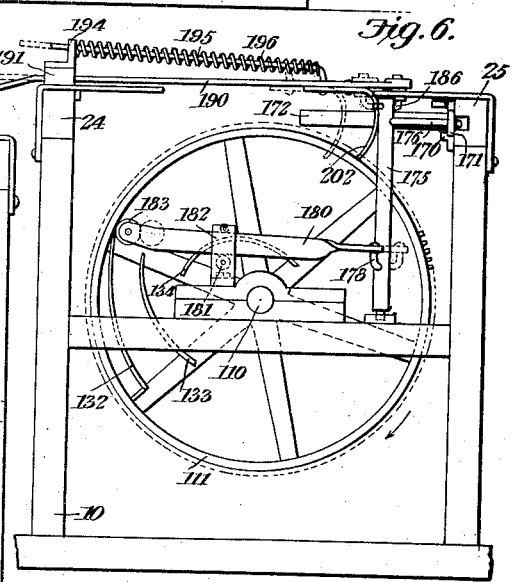
Figure 9:
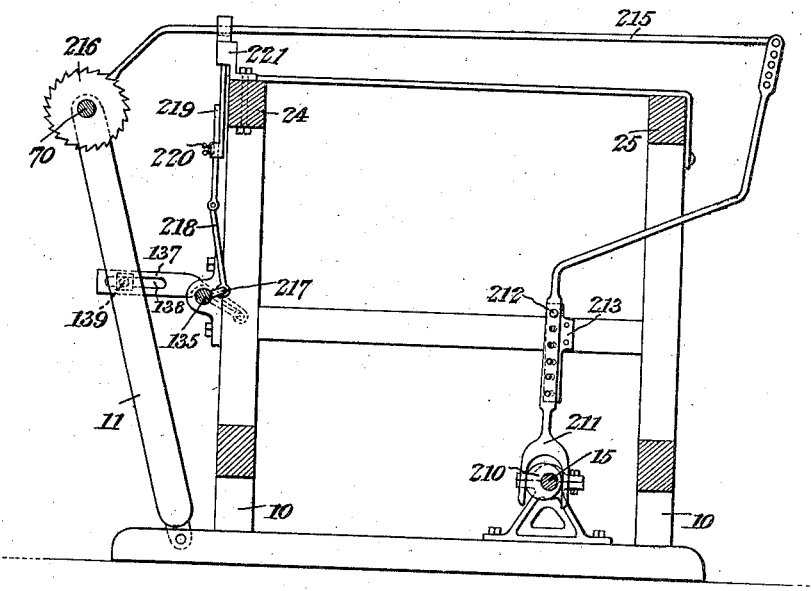
Figure 10:
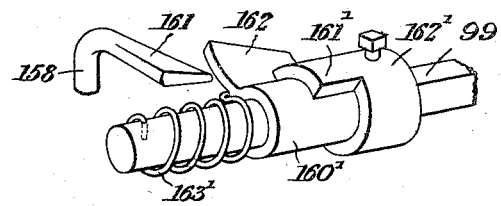

In the accompanying drawings, Figure 1 is a front elevation of a saw-filing machine constructed in accordance with the invention. Fig. 2 is a plan view of the same. Fig. 3 is an end elevation of the machine looking from the left of Figs. 1 and 2. Figs. 4, 5, and 6 are detail views of a portion of the mechanism, showing more especially the different positions of the main cams. Fig. 7 is a detail sectional view, on an enlarged scale, on the line 7 7 of Fig. 2. Fig. 8 is an elevation, partly in section, illustrating the connections at the actuating end of the main feed-bar, the view being on the line 8 8 of Fig. 5. Fig. 9 is a cross-sectional view of a portion of the frame, illustrating a modified form of feeding mechanism. Fig. 10 is a detail perspective view of the mechanism for locking the releasing-shaft.

Similar numerals of reference are employed to indicate corresponding parts throughout the several figures of the drawings.

The working parts of the machine are supported on a suitable frame 10, which may be formed of wood or metal, and pivoted to the lower rear side of the main frame is a swinging frame 11, in which the saws are supported, the connections being made adjustable to permit the use of the machine on saws of different diameters.

Near the lower front portion of the frame are bearings for a horizontally-disposed shaft 15, which carries two belt-wheels 16 and 17, arranged to receive motion from a line-shaft 18 through a pulley 19 and belt 20. The belt is kept running continuously, and during one portion of the operation—that is, during the sharpening of the saws—said belt is running over the pulley 17, and during the shifting of the machine for the purpose of adjusting the filing mechanism opposite another saw the belt is running over the pulley 16, and this latter pulley may at times be arranged to run loose on the shaft without transmitting movement to any part of the mechanism. The shaft 15 further carries a sprocket-wheel 22, having a key or feather fitting in a longitudinal groove 23 in the shaft, so that the sprocket-wheel may slide longitudinally of the shaft and receive motion therefrom at any point.

The upper part of the frame—that is to say, the longitudinal sills or bars 24 and 25—form supports for the reception of a longitudinally-movable carriage 26, which carries a filing mechanism, and on this carriage are bearings for the support of a shaft 27, having a sprocket-wheel 28, that is connected to the sprocket-wheel 22 by a link belt 29. Extending downward from the carriage is a light frame 30, which is provided at its lower end with a strap fitting within a groove in the hub 31 of sprocket-wheel 22, this being for the purpose of insuring movement of the sprocket-wheel lengthwise of the shaft as the carriage moves in the same direction.

Near the rear end of the carriage is pivoted a platform 33, the free edge of which projects somewhat beyond the rear edge of the main frame, and the free end of the platform is provided at one side with a lug 34, against which bears a spring 35, tending to hold the platform down. The spring is supported by a yoke-shaped frame 36, carrying a bar or pin 37, on which the spring is disposed, said bar or pin passing also through an opening in the lug 34. The vertical wall of the yoke 36 is provided with a vertically-elongated slot 38, through which passes a bolt 39, that screws into a threaded opening in a bracket 40, the construction being such as to permit adjustment of the stress of the spring in accordance with the area of the saw-surface to be filed for a purpose more fully set forth hereinafter.

The platform 33 is provided with a pair of grooved guide-bars 41 for the reception of a reciprocatory file-carriage 42, the front end of which is connected by a rod 43 to a wrist-pin 44, that projects from one side of a combined balance-wheel and crank-disk 45, the latter being mounted on the shaft 27.

Projecting from the upper face of a reciprocatory carriage 42 is an approximately vertical pin or stud 46, on which is mounted a block 47, that is free for limited play with the pin 46 as a center of movement, the movement being restrained, however, by a flat spring 49, having one end secured to the block 47 and its opposite end secured within a slotted lug 50, projecting from the carriage 42. The block 47 carries two file-supporting arms 55 and 56, at the outer ends of which are inturned lugs having openings for the insertion of the ends of the files, and each arm carries a clip 57, by which the tangs of the file are engaged and held. The two arms are arranged in different horizontal planes so that they may engage with different teeth of the saw—as, for instance, the file of the lowermost arm 55 will engage the first tooth and the file of the uppermost arm will engage the third tooth, and then on the next operation the second and fourth teeth will be engaged. The files cross each other in order to be presented at the proper angle to the saw, and the uppermost arm 56 rests on an inclined block 60, which may be adjusted laterally of the block 47 and locked in position by a set-screw 61. The function of the block 60 is to permit adjustment of the distances between the two files in order to accommodate saws having teeth of different pitch.

The lower arm 55 is preferably formed of a flat strip of spring-steel or other metal secured to the right-hand side of the block, while the arm 56, which may also be formed of a strip of steel, is given a quarter-turn at a point midway of its length, and the horizontal end is turned down and rests on the rear end of the block 47, a pivot-pin 63 being arranged to extend through said arm.

The files are held down to the work by the spring 35, which may be adjusted as before described in order to accommodate saws of different type and for the purpose of compensating for the condition of the files. This portion of the mechanism may be arranged to operate for the purpose of turning the saw automatically after each tooth is sharpened, this being accomplished by providing some means to resist the turning of the saw until the files cut away sufficient material to develop flat surfaces of large area which will offer such resistance to the further movement of the file thereover that during the second third, or some succeeding stroke the saw will be automatically turned in order to bring a fresh tooth into position. This portion of the mechanism, however, while of value in securing uniformity of sharpening, is not in all cases essential, and provision has been made in the present machine for positively turning the saws step by step until all of the teeth have been sharpened.

The swinging frame 11 carries a saw-supporting mandrel 70, and secured to said mandrel is a disk or wheel 71, having teeth of a number equal to the number of teeth in the saw. This toothed wheel is engaged by a feeding-pawl 72, that is slidably mounted in a bracket-arm 74, projecting from the bar 24 of the frame. This bracket 74 has bearings for the reception of the reduced end portions of a short rock-shaft 76, from which projects a rocker-arm 77, the latter passing through an opening at the inner end of the pawl 72, and a spring 78, surrounding this rocker-arm, bears against the bottom of the pawl and tends to hold its operating end in engagement with the teeth of the disk 71. Projecting from the rock-shaft is a second rocker-arm 80, to which is connected one end of a cam-actuated rod 82, and this arm also has a small spring 83, which serves to maintain the upper end of the rod 82 in elevated position.

Keyed to the main shaft 15 are two cam-disks 85 and 86, the disk 85 carrying a single cam member. The disk 86 is provided with two cams. The lower end of the rod 82 is bifurcated and is adapted to ride in grooves formed between and on the outer sides of the cam-disks, and this bifurcated end of the rod carries an antifriction-roller 88, which may be moved into engagement with either the disk 85 or the disk 86, so that for each complete rotation of the shaft 15 movement may be imparted to the toothed disk 71 for the purpose of rotating the saw-mandrel and presenting a fresh tooth to position to be sharpened, or by moving the roller into engagement with the disk 86 two saw-adjusting operations may take place for each rotation of the shaft 15, or the disks may be provided with different cams for the purpose of increasing the number of movements, if desired. This mechanism serves to impart a step-by-step rotative movement to the saw, and after each movement the files will be engaged with a fresh tooth or teeth, and the operation continues until the saw has made one complete revolution or more than one complete revolution, and all of the teeth have been sharpened.

In order to shift the filing mechanism lengthwise of the frame for the purpose of sharpening the successive saws, provision is made for moving the swinging frame 11 outward until the saw-carrying frame completes longitudinal movement and then for moving the swinging frame inward and presenting the saw to the action of the files, so that there will be no danger of injury to the saw, the files, or other portions of the machine during this adjustment.

Projecting from the inner face of the upper front bar of the machine are brackets 90, having bearings for antifriction-rollers 91, on which are mounted two longitudinally-movable bars 92 and 93, and these bars are provided with perforations 94 and 95, respectively, the perforations being spaced from each other at distances corresponding approximately to the distance between the several saws to be sharpened. The bar 92, which constitutes the carriage-feeding bar, receives movement in the direction of its length; but such movement is limited in one direction by an inwardly-projecting arm 96 at the left-hand end of the bar 24 and at the opposite end by a bracket 97, that projects inward from the inner face of said bar 24.

The bracket 97, together with a second bracket 98 near the left-hand side of the frame, supports a rock-shaft 99 of non-circular form in cross-section. The rock-shaft 99 carries a slidable collar 100, the opposite ends of which fit between ears 101, projecting from a bracket 102, that depends from the slidable carriage, so that the carriage and collar must move together in a direction lengthwise of the frame; but the collar and shaft may rock independently of the carriage and its bracket. Extending from the collar 100 is an arm 103, that projects over the two bars 92 and 93 and is provided with an opening in alinement with the row of openings in the bar 92. Through these openings extends a locking-pin 104, the upper end of which is guided in an opening formed in a bracket 105, extending from the carriage, and around said pin is arranged a helical compression-spring 106, that tends to force the pin through the opening in the bracket and one of the openings or perforations of said bar 92.

During the shifting of the carriage from saw to saw, as will hereinafter appear, the rock-shaft 99 is turned for the purpose of raising the arm 103, and the outer portion of this arm engages a collar or flange 107, carried by the pin 104, drawing the pin upward from the opening of the bar 92, after which said bar is moved toward the right of the machine for a distance sufficient to present another opening under the pin 104, after which the rock-shaft turns in the opposite direction, allowing the locking-pin to enter the new opening. The bar 92 then moves toward the left of the machine, and the carriage is moved to the next position for operation on another saw.

The frame of the machine is provided with bearings for the reception of a short shaft 110, on which is mounted the gear-wheel 111, that is in mesh with a pinion 112 on the main shaft 15, and said pinion has one or more pins 113 projecting from its side, these being arranged to enter recesses in the belt-pulley 16 for the purpose of locking the pinion to the pulley. A spring 114, extending between the left-hand bearing of the shaft 15 and the hub of the pinion 112, tends to keep the pinion clutched to the pulley; but the pinion may be disconnected when desired by pulling outward on the clutch-operating lever 116, that is pivoted on a bracket 115 at the left-hand end of the machine. The lever is provided with an opening for the passage of a rocker-arm 118, that projects from a vertically-disposed rock-shaft 119, having bearings carried by the frame, and said shaft carries a second rocker-arm 120, that engages the upper arm of a lever 122, pivoted at a point intermediate of its ends to a bracket 123, projecting from the end of the frame. The lower end of the lever 122 carries an arm 124 extending inwardly parallel with the shaft 15 and having a bifurcated end that enters a groove 125, formed in the hub of the pinion. When the clutch-operating lever is pulled outward, the pinion will be released from the belt-pulley, and if the driving-belt is engaging said pulley the latter will rotate idly without transmitting movement to any portion of the machine. The parts may be locked in this unclutched position by forcing the lever sidewise into a locking-notch 126, formed in a small bracket 127, projecting from the frame, said bracket also affording an upper bearing for the vertical rock-shaft 119. The unclutching of the pinion from the belt-pulley may also be accomplished automatically by inserting a pin or other stop $x$ in one of the openings of the bar 93, and when the arm 103 of sleeve 100 engages against this pin the bar 93 will be moved toward the left of the machine, and said bar 93 has an opening near its extreme end for the passage of the rocker-arm 118, so that whenever the bar is moved toward the left the mechanism will be automatically stopped. This permits the running of the machine automatically up to any desired point without the constant presence of an attendant, it being merely necessary for the latter to insert the pin $x$ or some other projecting member into any opening of the bar 93, and when the filing mechanism has worked up to that point the machine will be automatically stopped.

The large gear 111 carries cams 132, 133, and 134, all of which project from the left-hand face of the gear-wheel, and from these cams motion is imparted to the various mechanisms which control the adjustment of the filing-frame in the direction of the length of the machine.

The swinging saw-frame 11, which is the first member to be adjusted when the filing-frame is to be shifted, is operated from a rock-shaft 135, mounted in bearings at the rear of the frame and provided with two rocker-arms 136, these arms having pins at their extreme ends, and to the pins are pivoted the inner ends of arms 137. The arms 137 are each bent to form two portions at an obtuse angle to each other, and the outer portion is provided with an elongated slot 138 for the passage of a bolt 139, by which the arm may be rigidly locked to the swinging frame, this connection permitting of such adjustment as may be necessary to permit the machine to operate on saws of different diameter. When the swinging frame is in working position—that is to say, with the saws acting on the files—the point of connection between the arm 137 and the rocker-arm is in a plane below the axis of the rock-shaft, as shown in Fig. 3, so that a positive lock is formed, and the swinging frame is held rigidly in working position. In order to assist the outward movement of the frame, a pair of springs 140 is arranged between the rear portion of the main frame and the swinging frame, the springs tending to throw said swinging frame outward during the first portion of the shifting operation.

The rock-shaft 135 is provided with a third rocker-arm 142, that is connected to the outer end of a bar 143, the latter being mounted between a pair of antifriction-rollers 144, that are carried by a suitable standard 145, extending upward from the base of the machine. The bar 143 has two antifriction-rollers 146 and 147, which are successively engaged by the cam 132, the roller 146 being engaged first, so that the swinging frame 11 will be forced outward from the position shown in Fig. 3 to that shown in Fig. 4, the latter figure illustrating the position of the parts at the time the cam has completed the first portion of its operative movement. Toward the end of the movement—that is to say, after the saw-filing carriage has been adjusted—the cam 132 will engage with the roller 147 and will draw the swinging frame inward to working position.

During the outward swinging of the frame 11 the cam 134, which is nearest the shaft 110, is acting on an antifriction-roller 150, that is carried by a vertically-disposed bar 151, guided between a pair of antifriction-rollers 152, that are supported by an inclined cross-bar 155, disposed near the left-hand end of the main frame. The upper end of the bar 151 engages a rocker-arm 156, that projects from a horizontally-disposed rock-shaft 157, that is mounted in suitable bearings on the vertical end standards of the frame, as shown more clearly in Fig. 5. Near the rear end of the shaft 157 is an approximately vertical rocker-arm 158, the upper end of which extends through an elongated slot 159, that is formed near the left-hand end of the carriage-moving bar 92. This rocker-arm is surrounded by a coiled compression-spring 160, that tends to maintain the bar 92 in in elevated position, although the spring in all cases will not be necessary. The upper end of the rocker-arm 158 is provided with an approximately horizontal arm 161, that projects over the bar 93 and engages the cam 162, that projects from the rock-shaft 99. The end of the rock-shaft is circular in cross-section, and the cam is provided with a collar 160', which is held against the lug 161', projecting from an adjustable collar 162' on the shaft, by means of a coiled spring 163', as shown in Fig. 10. That surface of the arm 161 which engages under the cam 162 is inclined in the same direction as the cam, and when it moves under said cam the rock-shaft 99 will be turned in one direction for the purpose of moving the pin 104 from engagement with one of the perforations of the bar 92. The arm is arranged to pass completely under the cam and beyond the inner and lowermost end thereof, and then on reverse movement to ride over the top of the cam and spring 163' yielding to permit this operation.

The left-hand end of the bar 92 is bent into U-shape form or otherwise constructed to form a guide for an adjustable block 165, which may be moved by a set-screw 166 for the purpose of adjusting the effective length of the slot 159, in which the rocker-arm 158 moves, and the position of this block will determine the extent of feeding movement imparted to the carriage. In the operation of this portion of the mechanism it will be seen that the cam 134 depresses the roller 150, rock-shaft 157 will be turned, and the movement transmitted to the rocker-arm 158 will be to the right. The upper end of the rocker-arm will first travel freely in the slot 159 during the time the arm 161 is acting on the cam 162 for the purpose of rocking shaft 99 and raising the locking-pin 104 from the bar 92; but after this movement is completed the rocker-arm 158 will engage against the end wall of the slot 159 and will move the bar 92 to the right in order to present a second opening or perforation of such bar in position under the pin 104, and the latter may then move down under the influence of its spring 106 and enter said opening.

On referring to Fig. 5 it will be seen that the roller 150 is in such position as to pass under the influence of the cam 133, and as the gear-wheel is further turned this outer cam 133 will act on the roller 150, raising the latter and turning the rock-shaft 157 in the opposite direction, so that rocker-arm 158 will now be moved to the left. During this movement the arm 161 will travel over the cam 162. The rocker-arm 158 will then engage with the adjustable block 165 and will operate through the latter to transmit movement to the bar 92, the distance to which the latter is moved being dependent on the position of said block, and this permits accurate adjustment of the file-carriage-shifting mechanism in accordance with the distance between the saws to be sharpened.

The inner face of the upper front bar of the main frame is provided with guides 170 for a longitudinally-movable bar 171, carrying a belt-shifting loop 172, through which a driving-belt passes, and this mechanism is operated automatically to alternately move the driving-belt between the two pulleys 16 and 17, the belt running on the pulley 17 during the filing operation, and when all of the teeth of a saw have been sharpened the belt is automatically shifted to the pulley 16 for the purpose of operating the gear 111 and shifting the position of the filing-carriage. At the completion of this shifting operation the belt is again moved to the pulley 17, and the filing operation is again started.

At the left-hand end of the frame is a vertically-disposed rock-shaft 175, from which projects a rocker-arm 176, that is connected to the slidable bar 171. This rock-shaft further carries a rocker-arm 178, that is connected to a bar 180, the latter being guided by antifriction-rollers 181, carried by a bracket 182. The free end of the bar 180 carries an antifriction-roller 183, that is arranged to be engaged by the outer cam 132, as will be seen on reference to Fig. 6, and this cam will move the bar 180 from the position shown in full lines to the position shown in dotted lines in Fig. 6, thus turning the rock-shaft, and through the rock-shaft the bar 171 is moved to the right, and the belt 20 is carried from the pulley 16 to the pulley 17 to start another filing operation. The vertically-disposed shaft 175 also carries a third rocker-arm 186, which is connected to the inner end of a transversely-disposed knock-off bar 190. This bar extends rearwardly across the frame and is guided in a block or bracket 191, while near the rear end of the bar is a shoulder 192, that is arranged to engage against the rear wall of the bracket for the purpose of holding the bar to the rear and maintaining the belt-shifter with the belt running over the pulley 17. The block or bracket carries a lug 194, through which is guided a rod 195, connected to the knock-off bar at a point between the connection of the rocker-arm 186 and the locking-shoulder 192, and said rod is encircled by a compression-spring 196, which when the shoulder is released from the guide-block 191 will immediately move the knock-off bar to the opposite position, and this movement will be transmitted through the rocker-arm 186 to the shaft 175 and from the latter through the rocker-arm 176 to the belt-shifter slide, thus transferring the belt to the pulley 16 for the purpose of operating the filing-carriage-shifting mechanism.

The extreme inner end of the knock-off bar carries an antifriction-roller 198, which is engaged by a cam 199, the latter being pivoted to a collar 200, that is adjustably secured to the saw-mandrel and rotates therewith. Between the cam and collar is a compression-spring 201, that tends to move the cam back to its proper position out of the way of the friction-roller on the rear end of the knock-off bar when the latter is moved back to initial position preparatory to holding the belt 20 on pulley 17. At each complete rotation of the saw-mandrel the cam 199 will engage the roller 198 and shift the knock-off bar until the shoulder 192 is clear of the block 191, whereupon the spring 196 will move the knock-off bar in the manner previously described for the purpose of shifting the belt from the pulley 17 to the pulley 16.

Depending from the knock-off bar is a stop-arm 202, that is designed to be engaged by the cam 132 after the latter has made one complete rotation, thus affording a positive stop for the cam-carrying gear, and there can be no accidental rotative movement of said gear until the knock-off bar has been moved to release position, in which event the stop member moves out of the path of the cam and allows the cam-carrying wheel to rotate.

In order to increase the rapidity of operation, a plurality of saw-filing carriages may be employed, an additional carriage 203 being indicated in Figs. 1 and 2. These carriages are connected by a screw-shaft 204, that is provided with a crank-handle 205, and by turning said screw-shaft the carriages may be properly adjusted with relation to each other and in accordance with the distance between the saws to be filed, after which they may be firmly clamped together by a screw 207, passing through a slotted bar 208 on the secondary carriage and entering the threaded opening formed in the main carriage.

In Fig. 9 is shown a modification of the feeding mechanism by which the saw-mandrels may be turned. In this case the main shaft 15 is provided with an eccentric 210, engaging in the bifurcated lower end of a lever 211, that is mounted on a pivot-pin 212. The pivot-pin may extend through any one of a series of openings formed in the lever and through any one of a series of levers formed in a rigid plate 213, carried by the frame of the machine, so that the effective throw of the lever may be readily adjusted. The upper end of the lever is provided with a series of openings and a suitable pin to permit adjustable connection with a pawl-rod 215, that is arranged to engage with the teeth of a disk 216, that is carried by the mandrel-shaft. In order to prevent accidental feeding movement during the return of the swinging frame 11, the rock-shaft 135 is provided with an arm 217, Fig. 9, that is connected by a link 218 to a slidable bar 219, the latter being formed in two sections, which may be adjusted and locked in adjusted position by a screw 220. The upper end of the bar is guided in a bracket 221 and is provided with an opening for the passage of a pawl-bar 215. It will be seen that when the frame 11 is in operative position that the pawl-bar will be held in engagement with the teeth of the feeding-disk 216, but when the frame is swung outward the arm 217 will be moved to an approximately vertical position and the bar 219 will be elevated, thus raising the pawl-bar out of engagement with the teeth of the feeding-disk.

I claim—

1. In a gin-saw-filing machine, a frame, a mandrel arranged for the support of a plurality of saws, a movable frame carrying said mandrel, means for rotating the mandrel step by step, a carriage mounted on the frame, a filing mechanism on the carriage, an operating mechanism common to the mandrel, carriage and saw-filing mechanism, and connections between the common operating means and the mandrel, carriage and saw-filing mechanism, timed to automatically operate at the completion of each rotative movement of the mandrel to move the latter out of engagement with the files, to then shift the carriage to bring the files into alinement with the next saw and then return the mandrel to bring the saws into engagement with the files.

2. In mechanism of the class described, a saw-support, a pivotally-mounted platform, a reciprocatory plate carried by the platform, a block pivoted to said plate, file-carrying arms projecting from the block, a spring tending to prevent oscillatory movement of the block, and means for depressing the platform and holding the files in engagement with the teeth of the saw.

3. In mechanism of the class described, the combination with a saw-support, of a pivotally-mounted reciprocatory file-carrying member supported thereby, a bracket at one side of the platform, a slotted yoke adjustably secured to the bracket and provided with parallel horizontal arms disposed above and below said platform, a guide-rod extending between said arms and passing through the opening in the platform, a spring arranged between the upper arm and the top of the platform and tending to depress the platform.

4. In mechanism of the class described, the combination with a mandrel arranged for the support of a plurality of saws, of a frame, a carriage movable lengthwise of the frame, a filing mechanism supported by the carriage, means operable at the end of each complete rotative movement of the mandrel for shifting the carriage to present the filing mechanism into alinement with the next saw, a driving member, and means under the control of the revoluble mandrel for alternately connecting said driving member to the saw-filing mechanism and the carriage-shifting mechanism.

5. In mechanism of the class described, the combination with a mandrel arranged for the support of a plurality of saws, of a frame, a carriage movable lengthwise of the frame, a saw-filing mechanism supported by the carriage, a driving-belt, belt-pulleys, one operatively connected to the saw-filing mechanism, and the other to the carriage-shifting mechanism, and means operable at the end of each complete rotation of the mandrel for shifting the belt from the filing-mechanism-operating pulley to the carriage-shift-driving pulley.

6. In mechanism of the class described, a mandrel arranged for the support of a plurality of saws, a frame, a carriage movable lengthwise of the frame, a filing mechanism supported by the carriage, a driving-belt, a pair of pulleys, one connected to the saw-filing mechanism, and the other to the carriage-shifting mechanism, and a belt-shifter for automatically moving the belt to the pulley of the carriage-shifting mechanism at the completion of each rotation of the mandrel, and for returning the belt to the pulley of the filing mechanism after the carriage has been shifted.

7. In mechanism of the class described, the combination with a mandrel arranged for the support of a plurality of saws, of a frame, a carriage slidably mounted on the frame, a filing mechanism supported by the carriage, a carriage-feed bar, means for locking the carriage and bar to move the carriage in one direction, and for disconnecting them to move the bar alone in the other direction, and means for reciprocating said bar at the completion of each rotation of the mandrel.

8. In mechanism of the class described, a mandrel for the support of a plurality of saws, a frame, a slidable carriage thereon, a filing mechanism supported by the carriage, a perforated bar for feeding the carriage, a rock-shaft, an arm projecting therefrom, a pin under the control of the arm and serving to lock the carriage to said bar, and means operating at the end of each rotative movement of the mandrel for releasing the pin, moving the bar in one direction, then allowing the pin to again move to locking position and finally moving the bar in the other direction when the carriage is locked thereto.

9. In mechanism of the class described, the combination with a frame, and saw-filing carriage, of a perforated bracket on said carriage, a perforated feed-bar, a spring-pressed pin arranged to lock the bracket to the bar, said bar being provided at one end with an elongated slot, a rocker-arm extending through the slot and having a cam-shaped extension at its upper end, a rock-shaft, a cam carried thereby and disposed in the path of movement of such cam-shaped extension, a pin-engaging arm projecting from the rock-shaft, and means for actuating said rocker-arm at predetermined intervals to effect unlocking of the carriage and reciprocatory movement of the perforated bar to advance said carriage.

10. In mechanism of the class described, the combination with a file-carriage, of a feeding mechanism therefor comprising a longitudinally-movable bar, means for locking the carriage thereto, said bar having at one end an elongated slot, a block, means for adjusting the block over one end of the slot to alter the effective length thereon, a rocker-arm operating in the slot to effect reciprocatory movement of the bar, a rock-shaft, means at one end of the rock-shaft for releasing the carriage from the bar, and a cam disposed at the opposite end of the shaft and actuated by said rocker-arm.

11. In mechanism of the class described, a saw-mandrel, a frame, a carriage slidably mounted on the frame, a carriage-feeding mechanism including a reciprocatory bar, means for locking and releasing the carriage and bar, a rock-shaft, a rocker-arm projecting therefrom and engaging said bar, a second rocker-arm projecting from the shaft, a lever connected to said second rocker-arm, and a revoluble cam for engaging the rocker-arm and transmitting movement to the rock-shaft.

12. In mechanism of the class described, the combination with a frame, of a carriage mounted thereon, means for moving the carriage lengthwise of the frame, a saw-filing mechanism on the carriage, a pivoted frame, a saw-supporting mandrel on the pivoted frame, a driving-belt, a pair of pulleys with which said belt may be connected, one of the pulleys being connected to the saw-filing mechanism, a pinion, a clutch for connecting the pinion to the second pulley to drive the pinion, a gear-wheel with which said pulley intermeshes, a series of cams carried by the gear-wheel and lever systems in the paths of the cams arranged to transmit movement to the carriage, the pivoted frame, and to effect the shifting of the belt from the pinion-driving pulley and the pulley of the filing mechanism.

13. In mechanism of the class described, the combination with a frame, of a carriage mounted thereon, means for moving the carriage, a saw-filing mechanism on said carriage, a pivoted frame, a saw-supporting mandrel on said pivoted frame, a belt-shifting bar, a driving-belt, a pair of pulleys with which the belt may engage, one of said pulleys being connected to the saw-filing mechanism, a pinion, a clutch for connecting the pinion to the second pulley to drive the pinion, a gear-wheel with which said pinion intermeshes, a plurality of cams carried by the gear-wheel and lever systems in the paths of the cams arranged to transmit movement to the pivoted frame, the carriage and the belt-shifter bar, and a stop carried by said bar and movable thereby into the path of the gear-wheel to arrest the movement of the latter.

14. In mechanism of the class described, the combination with a frame, of a carriage movable thereon, a saw-filing mechanism mounted on the carriage, a pivoted frame, a saw-supporting mandrel on the pivoted frame, a belt-shifter bar, means for locking the same in one position, a spring tending to move the shifter-bar from its locked position, a driving-belt, a pair of pulleys, one of which is connected to the saw-filing mechanism, a pinion, a clutch for connecting the same to the second pulley to drive the pinion, a gear with which said pinion intermeshes, a plurality of cams carried by the gear and lever systems in the paths of the cams arranged to operate the pivoted frame, the carriage and the shifter-bar, and a yieldably-mounted cam carried by the saw-mandrel and serving to move the shifter-bar to release position.

15. In mechanism of the class described, the combination with a saw-support, of a frame, a carriage movable thereon, an operating means for the carriage, including a clutch, and an automatic throw-off or stopping device comprising a perforated or recessed bar in the path of movement of the carriage, and arranged to receive an adjustable stop member with which said carriage may engage, and a connection between the bar and clutch whereby the movement of the bar will unclutch the operating means from the carriage.

In testimony that I claim the foregoing as my own I have hereto affixed my signature in the presence of two witnesses.

JNO. M. BEAVER.

Witnesses:
B. W. JAMES,
V. C. SIBLEY.